F. J. COSTELLO.
HOSE CLAMP.
APPLICATION FILED JULY 8, 1921.
1,397,943.
Patented Nov. 22, 1921.
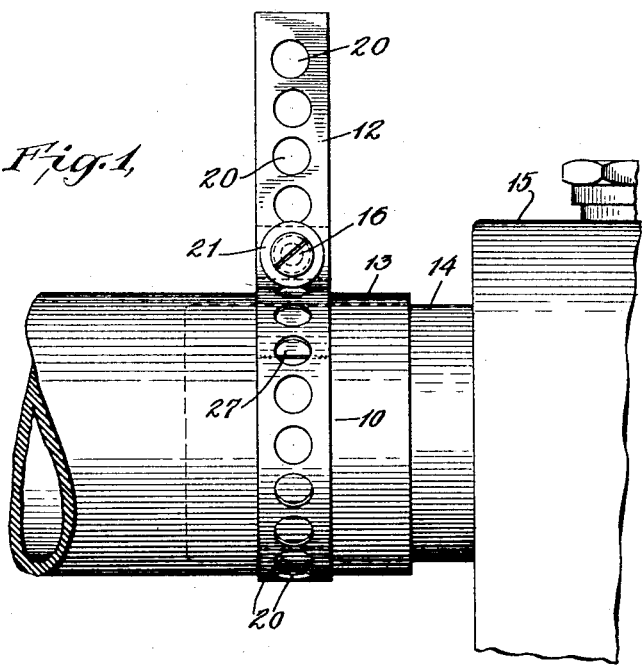
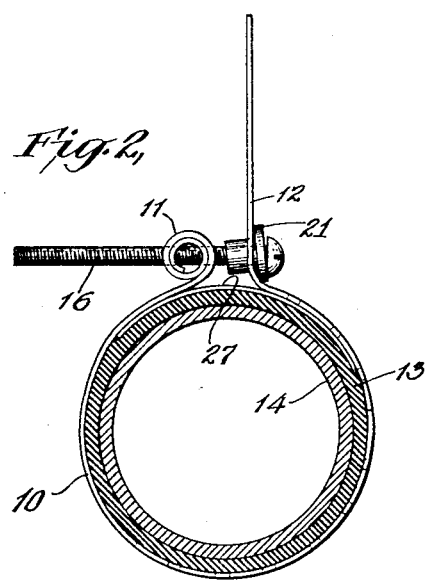
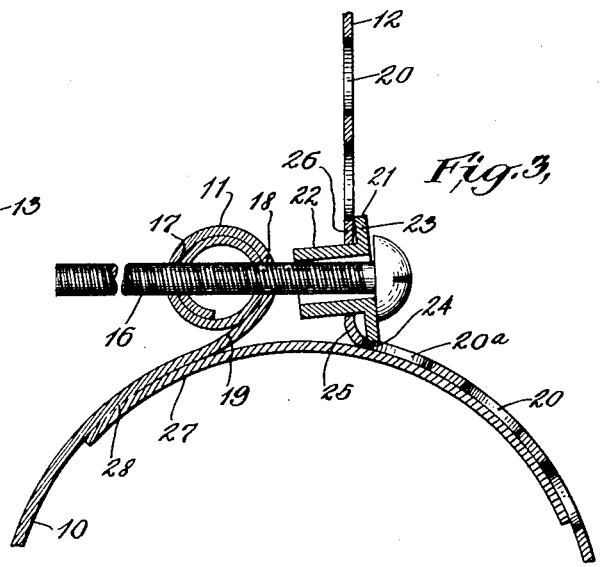
INVENTOR
FRANK J. COSTELLO
BY
Meyers, Cavanagh, Whitehead & Hyde
ATTORNEYS

UNITED STATES PATENT OFFICE.

FRANK J. COSTELLO, OF BALTIMORE, MARYLAND, ASSIGNOR TO FEDERAL TIN COMPANY, INC., OF BALTIMORE, MARYLAND, A CORPORATION OF NEW YORK.

HOSE-CLAMP.

1,397,943.  Specification of Letters Patent.  Patented Nov. 22, 1921.

Application filed July 8, 1921. Serial No. 483,132.

*To all whom it may concern:*

Be it known that I, FRANK J. COSTELLO, a citizen of the United States, and resident of Baltimore, in the county of Baltimore and State of Maryland, have invented certain new and useful Improvements in a Hose-Clamp, of which the following is a specification.

This invention relates to hose clamps and more particularly to a hose clamp made of sheet metal and adapted to be employed with hose of different diameters; and has special reference to the provision of a hose clamp of this nature made of few parts and constructed to efficiently withstand the strains and stresses incident to its normal use, my present invitation being designed as an improvement to the hose clamp shown in the patent to Cook and Cook, No. 1,236,546, of August 14, 1917.

A prime desideratum of my present invention comprehends the provision of a hose clamp made of sheet or strip metal and embodying means for adapting the device to hose of greatly varying diameters, the clamp being constructed and being provided with means for effectively strengthening the weakened portions thereof, a strong and durable adjustable clamp being thereby effected. In a clamp of the type described in the above mentioned patent to Cook and Cook, flexible sheet metal is cut into strip form and shaped to effect a hose clamp provided with a body portion adapted to be rolled about and to encircle a hose and opposed clamping portions adapted for the reception of a tightening bolt or screw, one of the clamping portions being rolled or coiled upon itself to provide a nut and more particularly a multi-walled nut having alined and preferably threaded apertures for receiving the tightening screw. Such a construction has been found to be highly efficient in practice, the opposed clamping portions not only providing inexpensive and integral nut means for receiving and locking the tightening bolt, but providing opposed clamping elements which will rigidly "stand up" under the strains and stresses incident to the tightening up operation, and which will provide proper means for sustaining such strains and stresses. It has been found desirable to provide a clamp of this type having a wide range of adjustment to fit hose of varying diameters. I have found that the clamp may be conveniently modified to permit of the desired range of adjustment by varying the construction of one of the opposed clamping portions, by retaining the same in strip form and by providing therein a plurality of apertures spaced longitudinally thereof and intended for the selective reception of the tightening up screw or bolt.

By providing a clamp of this nature it has been further found that the clamping portion in strip form, especially when apertured, will not practically withstand the strains to which it is subjected during use. The metal strip or ribbon when manufactured in relatively thin strips, and especially when provided with enlarged apertures for freely receiving the tightening up screw, provides a "weak link" in the clamp which it is desired to avoid. The screw or bolt during the tightening up or clamping operation produces a sharp bend in the clamping strip portion, tending to break the same; and the head of the bolt "biting" into the metal, usually at the cut out or apertured regions subjects the same to tear under the clamping strain. Moreover, the thin metal strip in being relied upon to sustain the strain effective on the shank of the bolt is further subjected to undesirable breakages. It has therefore been found desirable to provide means for strengthening the weakened clamping strip of the clamp to prevent the same from the bending, tearing and breaking stresses and to afford a construction in which the clamping nut and strip portions will rigidly "stand up" under the circumferential and binding stresses when in clamping use.

The principal objects of my invention therefore include, besides the provision of a hose clamp of the nature described and adapted for a wide range of adjustment and for use with hose of different diameters; the provision of such a hose clamp in which one of clamping members is retained in strip form and provided with a plurality of apertures for selectively receiving a tightening screw to effect the desired adjustability; the provision of such an adjustable clamp in which strengthening means is provided for causing the apertured metal strip to efficiently withstand the strains incident to clamping use and the further provision of such a sheet metal clamp made of the fewest of parts, subject to simplicity of manufacturing operations to secure an inexpensive clamping unit.

To the accomplishment of the foregoing and such other objects as may hereinafter appear, my invention consists in the elements and their relation one to the other, as hereinafter particularly described and sought to be defined in the claims, reference being had to the accompanying drawings which show a preferred embodiment of my invention and in which:

Figure 1 is a side elevational view of my improved clamp showing the manner of its use.

Fig. 2 is a front elevational view of the same, and

Fig. 3 is an enlarged detail view of the same with parts shown in section.

Referring to the drawings, the clamp of my present construction is preferably shaped from flexible sheet material and cut into strip form to provide a body portion 10 and opposed clamping portions 11 and 12 respectively, the body portion 10 being intended to be rolled about for encircling a flexible hose section such as a rubber hose 13 telescoping, for example, with a pipe section 14 forming part, for example, of an engine or other apparatus 15. The clamping portions 11 and 12 are intended for the reception of a tightening bolt or screw 16, rotation of the screw effecting the desired clamping action of the clamp for securing the desired closure between the flexible hose 13 and the pipe section 14.

The clamp of my present invention preferably takes the form of the type of clamp shown in the patent to Cook and Cook above mentioned, one of the clamping portions such as 11 being rolled or coiled upon itself to provide the nut and lock described in the said patent to Cook and Cook. The coil portion 11 is provided with a plurality of registering apertures 17 and 18, the apertures being preferably threaded for coaction with the thread of the tightening screw 16. The coil portion 11 provides not only an integral nut and lock for the screw, but provides a rigid support for sustaining the circumferential strains in the clamp, the curved portion 19 between the body portion 10 and the coil 11 taking up the circumferential strains without subjecting the metal strip of which the clamp is made to any bending stresses.

For the purpose of adapting the device to provide for a wide range of adjustment to fit hose of varying diameters, the opposed clamping portion 12 is retained in strip form and provided with a series of apertures 20 arranged longitudinally thereof, the apertures functioning for selectively receiving the tightening up bolt 16, depending upon the diameter of the clamp desired.

For the purpose of strengthening the strip or ribbon clamping portion 12 and for the purpose of providing means for distributing the strains borne by the said clamping portion and for effectively sustaining the strains to minimize bending, tearing and breaking of the clamping portion 12, I provide strengthening and strain sustaining means which may take the form of a flanged bushing or sleeved washer 21, provided preferably for purposes of economy in manufacture, with integral sleeve and washer portions 22 and 23 respectively. The sleeve portion 22 is adapted for receiving the shank of the locking screw 16, the said sleeve portion being intended for selective insertion in any one of the plurality of apertures 20. The washer portion 23 provides means for coacting with the head of the screw 16 and provides further means coöperating with the strip portion 12 for taking up some of the strains thereon. Referring to Fig. 3 of the drawings, for example, it will be seen that the washer portion 23 coöperates with the strip 12 to exert a tangential pull thereon at a circumferential region therein such as 24, the washer preferably coöperating with the walls of an aperture such as 20ª for exerting the tangential pull, this coöperation between the washer 23 and the strip portion 12 preventing a sharp bend in the portion of the strip connecting the body thereof with the upturned clamping end 12. This is shown, for example, in Fig. 3 of the drawings, wherein such connecting portion designated as 25 forms a suitably curved bend, minimizing breakages at this point. The shank of the bolt 16 and the sleeve portion 22 of the sleeved washer also coöperate in a manner as shown in Fig. 3 to sustain part of the clamping stresses. The outer wall of the sleeve portion 23 further coöperates with the transverse web portion 26 of the strip 12 for taking up part of these clamping stresses, tearing of these web portions being prevented by the elimination of the sole engagement between the shank of the screw and the said web portions. The provision of the sleeved washer in its coaction with the head of the screw also prevents the said head of the screw from "biting" into the metal strip and tearing the same under clamping action, as in the case when the head directly coöperates with the strip 12. The provision of the sleeved washer 21 also prevents the catching of the thread of the bolt 16 with the walls of the apertures 20, the sleeve 22 further aiding in the alinement of the bolt with the threaded apertures of the nut or lock roll 11.

For purposes of economy of manufacture the clamp comprising the body portion 10 and the opposed clamping portions 11 and 12 is preferably made of a unitary strip of metal, this strip being rolled and formed to provide the desired shape. For the purpose of preventing, during the clamping up operation, the pinching of the rubber hose section by the clamp, the tongue 27 is provided, the said tongue being preferably attached to the body portion 10 as by spot welding the same as at 28, the said tongue being selected of a length to lap under the opposed strip portion 12, as particularly shown in Figs. 2 and 3 of the drawings.

The manner of construction and use of my improved hose clamp will, in the main, be apparent from the above detailed description thereof. It will be further apparent that I have provided a clamp made of few parts and adapted to afford a wide range of adjustment for use with varying diameters of hose, the nut or lock roll clamping means being combined with a strip clamping means to afford the desired adjustability. It will be further apparent that in providing means for strengthening the weakened apertured strip clamping portion, with the elimination or minimizing of the bending, breaking and tearing stresses incident to the clamping use of the strip, with the means distributing the strains and stresses, that I have provided a rigid, strong and durable clamping unit.

While I have shown and described my device in the preferred form, it will be obvious that many changes and modifications may be made in the structure disclosed without departing from the spirit of the invention, defined in the following claims.

I claim:

1. A hose clamp comprising a body portion and opposed clamping portions, the latter adapted to receive a tightening bolt or screw, one of said opposed portions being in strip or ribbon form and being provided with a plurality of apertures spaced longitudinally thereof to selectively receive the said tightening screw and a strengthening member receiving the said screw and providing a bearing therefor and adapted for selective insertion in the apertures in said strip portion.

2. A hose clamp comprising a body portion and opposed clamping portions, the latter adapted to receive a tightening bolt or screw, one of said opposed portions being in strip or ribbon form and being provided with a plurality of apertures spaced longitudinally thereof to selectively receive the said tightening screw and a flanged bushing receiving the said screw and providing a bearing for the shank and head thereof and adapted for selective insertion in the apertures in said strip portion.

3. A hose clamp comprising a body portion and opposed terminal portions formed of a unitary strip of metal, one terminal portion being coiled upon itself to form a multi-wall nut provided with alined apertures for the reception of a tightening bolt or screw, the other terminal portion being retained in strip form and being provided with a plurality of apertures spaced longitudinally thereof to selectively receive the said tightening screw, a strengthening member receiving the said screw and providing a bearing therefor and adapted for selective insertion in said apertures and a tongue portion attached to the strip adjacent the coiled terminal thereof and adapted to lap under the other terminal.

Signed at Baltimore, in the county of Baltimore and State of Maryland this 1st day of July, A. D. 1921.

FRANK J. COSTELLO.